March 23, 1965   A. A. HURSCHMAN   3,174,655
DROP OR SPRAY DISPENSER

Filed Jan. 4, 1963   3 Sheets-Sheet 1

INVENTOR.
ALFRED A. HURSCHMAN
BY
ATTORNEYS

March 23, 1965 A. A. HURSCHMAN 3,174,655
DROP OR SPRAY DISPENSER

Filed Jan. 4, 1963 3 Sheets-Sheet 2

INVENTOR.
ALFRED A. HURSCHMAN
BY
ATTORNEY

March 23, 1965  A. A. HURSCHMAN  3,174,655
DROP OR SPRAY DISPENSER
Filed Jan. 4, 1963  3 Sheets-Sheet 3
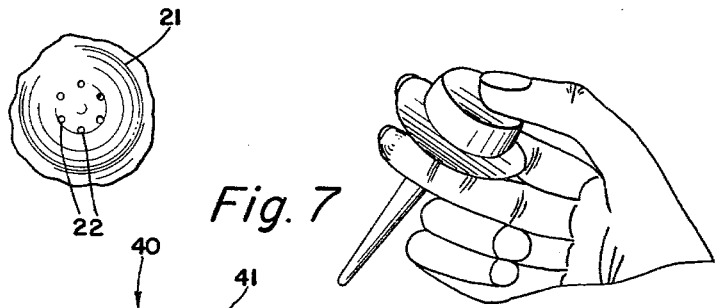
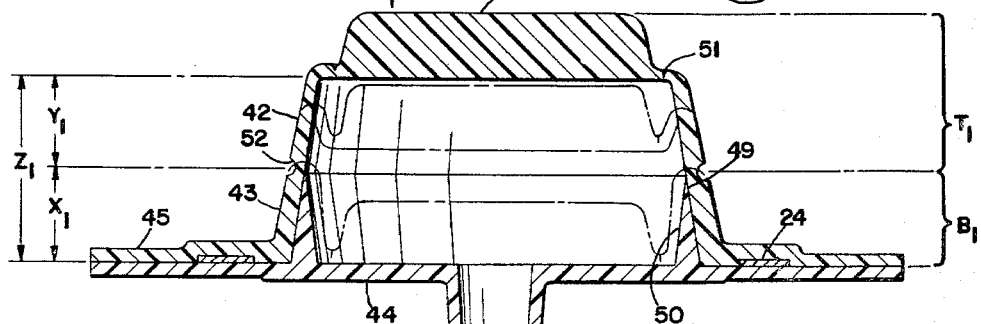
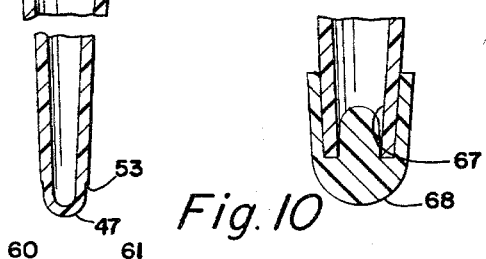
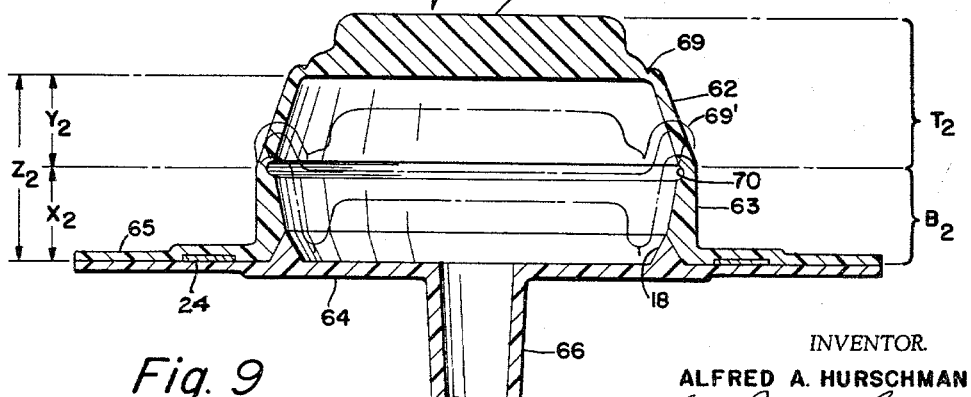
INVENTOR.
ALFRED A. HURSCHMAN
BY
ATTORNEY

United States Patent Office 3,174,655
Patented Mar. 23, 1965

3,174,655
DROP OR SPRAY DISPENSER
Alfred A. Hurschman, Hudson, Ohio, assignor to Ampoules, Inc., Hudson, Ohio, a corporation of Ohio
Filed Jan. 4, 1963, Ser. No. 249,416
17 Claims. (Cl. 222—215)

This invention relates to dosage unit dispensers and, more particularly, to devices for dispensing a flowable medicament in accurately controlled volume and in a sterile condition.

Many liquid medicinal agents are continually being dispensed by means of eye, ear, and nose droppers or syringes, rectal and vaginal syringes, and the like, having a flexible bulb secured to one end of a relatively rigid, elongated pipette. Such devices, notwithstanding their widespread usage, have many drawbacks. For instance, because of the difficulty of controllably collapsing the bulbs, it has been difficult to use conventional reusable, flexible bulb type dispensers with accurate dosage control when measurement by the drop is required. The use of transparent, graduated pipettes for administering premeasured unit dosages involves the hazard of human error. Assuring sterility of the medicaments and of the dispensers is often a serious problem because the supply of medicament is subject to contamination as soon as it is opened for use, and the dispenser must be sterilized after each use even if it was sterile when first used, which is often doubtful. Such dispensers are awkward to use for self-administration of medicaments, particularly when accurately measured dosages are required. Moreover, avoiding aspiration back into the dispenser is often a problem, especially where the dispenser is inserted into an opening of the body where the tip of the pipette may be submerged in the discharged liquid or in natural body fluid during the discharge operation.

In the copending application Serial No. 138,999 of Russell P. Dunmire (deceased), filed December 18, 1961, now Patent No. 3,094,987 new ampoule devices for delivering quantative dosage units of medicaments by hypodermic injection are disclosed and claimed. The present invention involves the discovery that the basic body or shell structures of those ampoules can be combined with a pipette stem and used to great advantage as disposable, precharged, single dose dispensers with accurate dosage control, or for accurately deliverying the dosage quantitatively in a drop-by-drop manner. Additionally a spray nozzle may be employed at the terminus or discharge end of the pipette for accurate spray applications of medicament.

The liquid-containing ampoule body of the present invention is a closed shell having a generally cylindrical form, although it may taper slightly over part or all of its axial length. It has a flexible side wall designed to fold circumferentially and collapse axially, and has a relatively rigid, circular, upper end wall against which pressure is applied to collapse the side wall. More specifically, the side wall comprises an upper flexible portion and a lower portion of slightly larger diameter that is relatively more rigid and inflexible than the upper portion, the upper, more flexible portion having annular, upper and lower zones of maximum flexibility which permit the upper portion to turn inside-out progressively until it is inverted and snugly nested inside of the lower portion.

The upper end wall and side wall structures are preferably integrally formed as an inverted cup with its mouth closed by a separately formed circular diaphragm and tubular pipette stem. The diaphragm and pipette are preferably integrally formed as a unit with the pipette stem extending axially and perpendicularly from the diaphragm, with the pipette bore opening at one end through the diaphragm. The opposite or discharge end of the pipette may take a variety of forms and is preferably closed in one manner or another until opened for use, so as to maintain the pipette bore in a sterile condition.

This particular construction provides an ampoule shell which is easily collapsed in a uniform manner by a slight application of pressure to the upper end wall. As the collapsing proceeds, the interior volume of the ampoule decreases until the entire upper portion of the shell is inverted and move downwardly within the lower portion. The relative dimensions of the upper and lower portions of the shell are selected in relationship to the total volume of the shell so that, when it is completely collapsed, the side wall of the inverted upper portion of the cup is disposed closely adjacent the inner side wall surface of its lower portion, and the upper rigid end wall of the cup is seated against the diaphragm. Thus, in the completely collapsed condition of the cup, the reservoir volume is practically nile. The collapsing may be controlled to gradually discharge, in a drop-by-drop manner if desired, at least 97% of the ampoule contents from the shell into the pipette. Substantially only the predetermined, small volume of the bore of the pipette stem cannot be discharged from the pipette. Thus, substantially complete evacuation of the shell may be obtained, and with an applied force of only about 2 pounds, which is easily applied by thumb pressure.

The shell is preferably constructed so that it does not readily return to the uncollapsed condition, thus minimizing any tendency to aspirate the ejected liquid medicament and/or natural body fluid back into the shell after the liquid medicament has been discharged. This is an especially important feature where dosage units of salves or other medicaments are to be ejected into auditory or rectal canals. It is accomplished by a special hinge action provided by the zones of maximum flexibility at both ends of the upper side wall portion of the shell. When the cup has been collapsed, this hinge action aids in locking the upper end wall of the shell snugly against the diaphragm so as to prevent the cup body from elastically expanding back toward its original shape and creating a partial vacuum, which would cause liquid to be sucked back into the shell through the pipette stem.

When the dosage unit applicator of the instant invention is intended to be used to eject a liquid spray, and optionally in other cases, a thin membrane (.001 inch thick or less) of any suitably inert plastic or the like is employed between the mouth of the cup-shaped body and the diaphragm. When axial pressure is exerted on the upper end of the cup-shaped portion, the thin membrane is easily ruptured and the liquid medicament is exhausted. While an initial force of 8 or 9 pounds or so must be applied to the upper end wall of the shell to burst the membrane seal, this is well within the normally acceptable limits for thumb pressure actuation.

The various objects, features, and advantages of the invention will be more fully understood from the following detailed description of several illustrative embodiments and from the accompanying drawings.

In the drawings:

FIG. 6 is a further enlarged view of the terminal or discharge end of the pipette portion of the dosage unit dispenser of FIG. 1, illustrating the multiple openings for producing a spray;

FIG. 7 is a perspective view illustrating the method of using the device of the present invention;

FIG. 8 is an enlarged, vertical, cross sectional view of a modified embodiment of the invention;

FIG. 9 is a similarly enlarged, vertical, cross sectional view of another modified embodiment of the invention; and FIG. 10 is a further enlarged, fragmentary view illustrating, partly in section, another form of pipette stem employing a removable cap to close the terminal end thereof.

Figure 1:
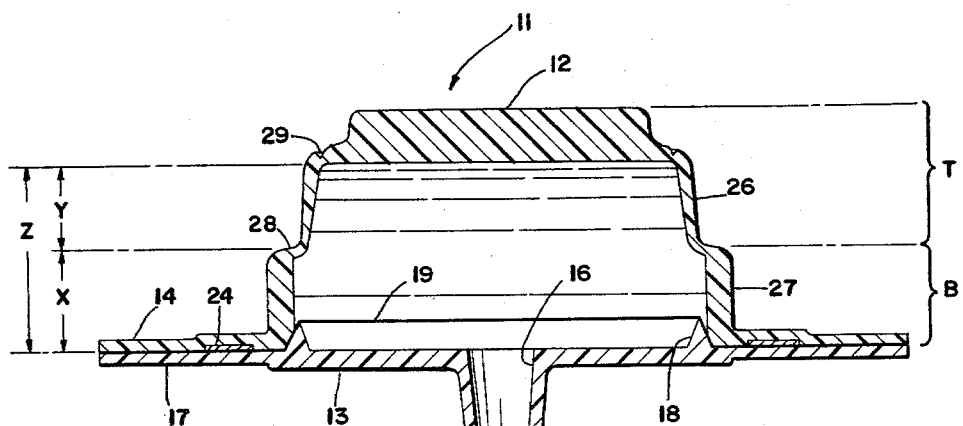
FIG. 1 is an enlarged, vertical, cross sectional view of one form of dosage unit dispenser of the invention that is presently preferred for use as a spray device.

Reference is first made to the embodiment of the invention designed for discharging liquid as a spray and illustrated in FIG. 1. The ampoule body or shell of the device, defining a liquid reservoir, comprises a main body member in the form of an inverted cup 11. A circular bottom 12 of the cup 11 is relatively thick and rigid and constitutes an upper end wall of the shell. A circular diaphragm 13 closes the open mouth of the cup 11 and constitutes a lower end wall of the shell, the cup being provided with an outwardly extending, peripheral flange 14 to which the diaphragm is sealed.

The diaphragm 13 has an integrally formed pipette stem 15 extending axially downwardly from the diaphragm. The pipette stem 15 is in open communication with the interior of the body or shell through an opening 16 in the diaphragm. The diaphragm also has an annular, outer, marginal portion 17 adapted to be heat-sealed to the peripheral flange 14 on the cup. A stiff, upstanding, annular rib 18 is integrally formed on the upper surface of the diaphragm on a diameter such that this rib may be snugly nested within the mouth of the cup 11 to position the diaphragm relative to the cup and temporarily to seal the juncture therebetween after filling the cup and during final assembly and final sealing of the diaphragm to the cup, as hereinafter described.

In this embodiment of the invention, a thin film or membrane 19 of any suitable inert plastic or the like extends like a drumhead across the upper, annular edge of the diaphragm rib 18, then downwardly along the outer surface of the rib and radially outwardly between the outer marginal portion 17 of the diaphragm and the flange 14 of the cup. This film or membrane serves to confine the liquid contents of the shell to the zone thereabove until the membrane is ruptured in the use of the device, permitting the liquid contents to be discharged through the pipette 15, as hereinafter described.

In order to provide a spray discharge, the lower or terminal end of the pipette 15 terminates in an end wall 21 that is perforated by a number of small apertures 22 distributed as shown on an enlarged scale in FIG. 6. In order to maintain at least the interior portion of the pipette in a sterile condition for use, it is desirable to exclude atmospheric air and moisture and other foreign, non-sterile matter from contact with the perforated tip of the pipette. If the pipette stem is to be inserted into a body opening, a sterile condition of the exterior surface of the pipette, or even of the entire dispensing device, may be desired. In the former case, the perforated tip of the pipette may simply be covered by a plastic cap 31, snugly retained by a friction fit with or without a suitably weak seal of cement or relatively viscous sealing material providing an impervious joint interface that may be easily broken by manually twisting off the cap. In the latter case, it would be preferable to enclose the entire dispensing device in a gas impervious overwrap of plastic film or the like (not shown).

The entire ampoule shell, including the cup 11 and the diaphragm 13, may be made of any stiffly flexible material which is inert and retains its strength when exposed to the liquid to be contained therein, and which will not rupture and/or tear as the shell is collapsed to discharge its contents. Suitable materials include tough, but relatively flexible elastomeric plastics such as polyethylene and various polyvinyl, polyester, and polyamide compounds and the like, plastic coated metal foils, and uncoated metal foils which may be joined to form a leakproof seal.

When, as in the preferred embodiments of the invention, the shell is made of a molded thermoplastic material and the cup 11 and diaphragm 13 are joined by heat-sealing, the peripheral flange 14 of the cup is preferably formed to provide an annular groove in which a metal ring 24 is seated. As more fully explained in a copending application, Serial No. 252,272, of Russell P. Dunmire (deceased), filed January 15, 1963, the electrically conductive ring 24 facilitates a quick and localized application of heat by electrical induction to effect the heat-sealing of the mating flanges while preventing the possibility of any liquid contents of the ampoule and/or the material of the ampoule itself being structurally weakened or otherwise deleteriously affected by the heat.

In the embodiment of the invention shown in FIGS. 1–6, the thin membrane 19 is sandwiched between the cup flange 14 and outer marginal portion 17 of the diaphragm 18, and is heat sealed to both in the annular region of the metal ring 24. The membrane material may be used in continuous sheet form in this manner, and the sandwiched portion thereof may be cut out of the sheet about the periphery of the ampoule body parts after the ampoule filling step and during or after the assembling and heat sealing operations.

The side wall of the cup 11 is preferably comprised of a flexible upper portion 26 and a lower portion 27 of larger diameter that is relatively more rigid and inflexible. In the preferred embodiment of the invention illustrated in FIG. 1, the upper side wall portion 26 is conically tapered with a slight outward and downward inclination from the upper end wall 12, while the lower side wall portion 27 is substantially cylindrical. The upper and lower portions of the side wall are integrally joined by a short, thin, circumferential shoulder 28, and an external, peripheral notch 29 is formed in the annular zone of mergence of the side wall with the upper end wall 12.

As shown, the relative wall thicknesses of the upper and lower side wall portions 26 and 27 of this embodiment of the ampoule shell are such that, when axially directed pressure is applied to the upper and lower end walls 12 and 13, the relatively rigid and inflexible lower side wall portion 27 will remain substantially undistorted, and the more flexible, upper side wall portion 26 will fold and progressively roll on itself until the top section of the body, designated T in FIG. 1, is completely inverted within the confines of the bottom section, designated B. To this end, the upper side wall portion 26 is made as thin as possible to permit an easy folding and rolling action while still retaining sufficient strength to resist fracture or bursting and tearing. It is also preferred to taper this portion of the side wall from a maximum thickness at its upper end to a minimum thickness at its lower end.

The lower portion 27 of the side wall of the ampoule shell may have a thickness approximately twice the maximum thickness of the upper side wall portion 26. The shoulder 28 between the upper and lower portions is no thicker and is preferably slightly thinner than the minimum thickness of the upper side wall portion so as to define a peripheral zone of maximum flexibility at which collapsing of the side wall is controllably initiated.

Figure 2:
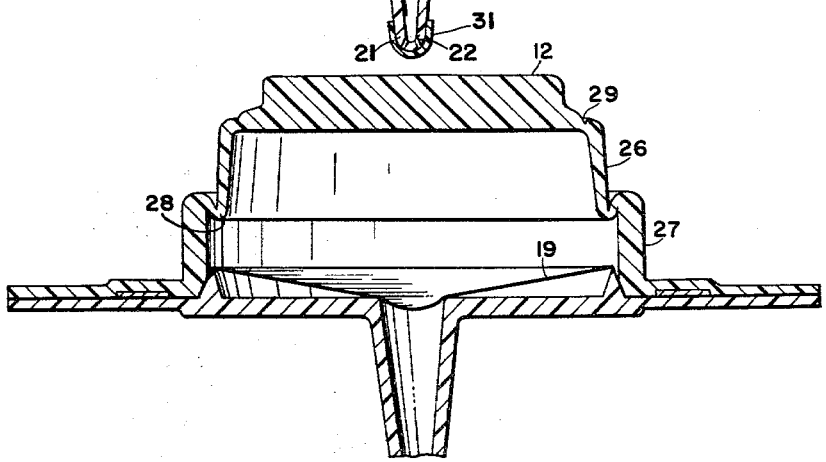
FIGS. 2 and 3 are similarly enlarged, vertical, cross sectional views of the dosage unit dispenser of FIG. 1 which illustrate successive stages in effecting evacuation of the device.
Figure 3:
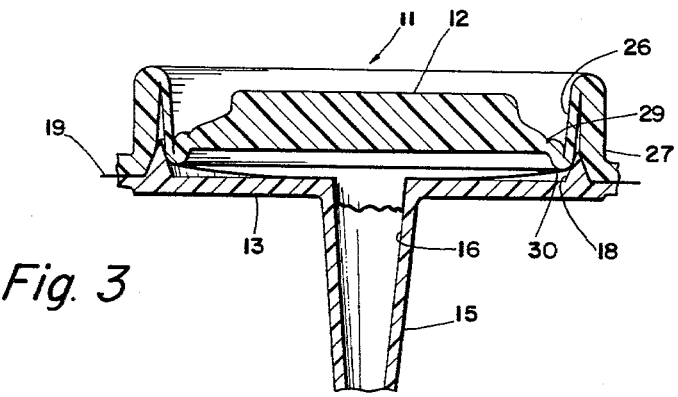

It will be seen in FIG. 2 that, when pressure is applied to the upper end wall 12 of the cup, the shoulder 28 of the cup defines and constitutes a primary hinge about which the side wall is first folded to initiate collapsing thereof. Continued application of pressure forces the flexible upper side wall portion 26 to progressively roll on itself until it is substantially turned inside-out and telescoped within the bottom section 27, as shown in FIG. 3. With continued application of pressure, the notch 29 forms a secondary hinge that facilitates reverse bending of the shell in this region, as required to force the upper end wall 12 of the cup to continue moving downwardly into engagement with the diaphragm 13 from the position shown in FIG. 3 to the position shown in FIG. 4. This completes the collapsing of the shell, the top section T, FIG. 1, being turned inside out and inverted so as to substantially fill the bottom section B.

Figure 4:
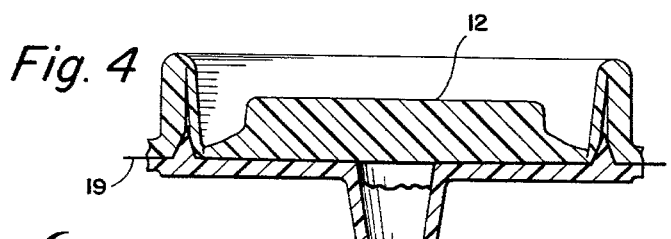
FIG. 4 is another similarly enlarged, vertical, cross sectional view of the dosage unit dispenser of FIG. 1 which illustrates the configuration of the device after completion of the medicament ejection.

Observing the progression of the collapsing action from the stage of FIG. 3 to the stage of FIG. 4, it will be seen how the bending at the secondary hinge by closing of the notch 29 has the effect of reducing the elastic force created at the reverse bend 30 in the side wall of the cup adjacent the upper end wall 12 that occurs during the final stage of downward collapsing movement. This reduces the elastic stresses tending to return the shell back toward its original shape. In fact, the action of passing through a dead center position at the location of the secondary hinge as the notch 29 is closed provides a locking action by which an elastic force is created that urges the upper end wall 26 downwardly against the diaphragm 13. The elasticity of the ampoule shell material is thereby utilized to resist return toward its original shape. In addition, as the relatively rigid end wall 12 seats against the diaphragm 13, it wedges within the confines of the diaphragm rib 18 so as to be further restrained against reverse upward movement. Thus, it will be seen that the secondary hinge at the notch 29 and the rib 18 act in concert to minimize the possibility of aspiration after the hypodermic liquid has been evacuated, as would occur if the shell should return even partially back toward its uncollapsed condition.

The thickness of the center portion of the diaphragm, of the opposed upper end wall 12 of the cup, and of the lower side wall portion 27 of the cup, are all sufficiently great to render them relatively rigid compared to the thinner, upper side wall portion 26 and to eliminate any significant distortion of the ampoule shell in those relatively rigid zones when a collapsing pressure is axially applied to the ampoule shell. This is important in effecting the above-described, predictably controlled, ampoule-collapsing action. The controlled collapsing action is, in turn, important in giving the user of the dispenser control over the rate of discharge of liquid from the pipette 15.

In order to obtain the maximum discharge of liquid medicament contained in the ampoule, it has also been found necessary to maintain a ratio between the height X (FIG. 1) of the lower side wall portion 27 and the total height Z of the side wall of the cup which will permit the upper end wall 12 of the cup to bottom against the diaphragm 13 and the upper side wall portion 26 to turn inside-out and lie closely adjacent the inner surface of the lower side wall portion 27. If this ratio is too small and the height X of the lower side wall portion 27 is substantially less than the height Y of the upper portion 26, the upper portion will not lie against the inside surface of the lower portion when the ampoule shell is collapsed. Conversely, if the ratio of the height X of the lower portion to the total height Z of the side wall is too large, the upper end wall of the cup will not be able to bottom against the diaphragm 13.

The optimum height ratio of the lower portion of the side wall to the total side wall depends upon the volume of the body 11, the material of which the body is made, the relative wall thicknesses, the length of the shoulder 28, and other design details, and will vary accordingly. However, in the particular embodiment illustrated in FIGS. 1–5, it has been seen that the height X of the lower wall portion 27 should exceed the height Y of the upper wall portion 26, and preferably should be in the range of from 50 to 60% of the total side wall height Z.

With the above-described relative heights of the upper and lower portions of the side wall, the resulting configuration of the collapsed ampoule shell resembles one cup snugly nested within another. This collapsed form of the shell assures that at least 97% of the hypodermic liquid will have been discharged from the shell into the pipette.

The preferred manner of using the device of the present invention, as illustrated in FIG. 7 is to hold the diaphragm portion against the balls of the first two fingers of the hand, with the pipette stem extending therebetween. The ball of the thumb is placed against the top or rigid upper end wall 12 for applying the collapsing pressure. When the device is held in this manner, the user can easily apply thumb pressure with a fine degree of control and force the shell to collapse substantially axially in the manner described above and illustrated in progressive stages in FIGS. 2–4.

The unique rolling action, by which the side wall of the ampoule shell initially folds about the primary hinge 28 and the flexible upper side wall portion 26 progressively rolls downwardly upon itself and turns inside-out against the inner surface of the lower side wall portion 27, requires a relatively small force to be applied to the ampoule. In most instances, a force of less than 2 pounds, or considerably less than the force exerted by a firm hand shake, is sufficient to collapse an empty shell.

During the initial stage of collapsing of the shell, hydraulic pressure is rapidly built up in the liquid contents of the shell, and the membrane 19 stretches (FIG. 2) and breaks or tears (FIG. 3), permitting the liquid to enter and pass through the pipette stem 15. The liquid passes out through the apertures 22 of the stem with such force that it is more or less atomized. The resulting spray of liquid medicament is not significantly different from that produced by pressurized aerosol bombs and the like.

As noted above, the pressure required to burst the membrane 19 adds considerably to the force of less than 2 pounds that would otherwise be required to collapse an empty ampoule shell, but not to an excessive degree. Also, the necessary small size of the pipette discharge openings 22 creates a significant back pressure which, in this case, is desired to balance the sudden diminution of the required shell collapsing force at the instant the membrane 19 bursts. It is frequently desired to prolong the discharge period so as to enable the spray to be applied gradually and, if desired, moved over a sizable area to be treated thereby. This back pressure may be controlled, within limits, by the discharge hole size employed at the tip of the pipette, and will normally and desirably be somewhat less than the pressure required to burst the membrane 19.

Figure 5:
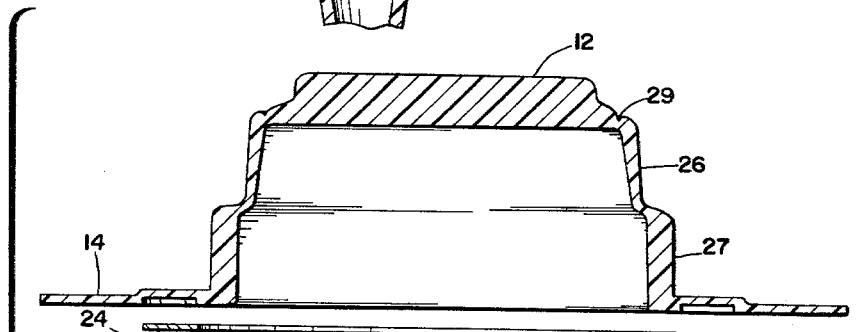
FIG. 5 is a similarly enlarged, exploded view of the components of the dosage unit applicator of FIG. 1, the parts being shown entirely or partly in vertical section.

Referring now to the method of filling, assembling, and sealing the dispensing devices of the invention, FIG. 5 shows the component parts of the device of FIGS. 1–4 separated axially from one another prior to assembly, with the thickness of the membrane 19 greatly exaggerated for greater ease of illustration. The cup 11, turned open end up, is charged with a measured amount of liquid medicament to fill the assembled shell above the membrane 19. This may be done before or after positioning the cup, open end up, in a suitable recess of a lower annular clamping die made of electrically non-conductive material so that the entire surface of the cup flange 14 is engaged by a mating annular surface of the die.

With the cup charged with liquid and so positioned in the lower clamping die, the metal ring 24 is seated in the annular groove of the cup flange 14; the sheet of membrane material is spread with slight tension across the open mouth of the cup; and the diaphragm 13 is lowered axially into its assembled relationship with the cup. In the course of the latter step, the diaphragm rib 18 engages the membrane sheet, pushing it inwardly within and tensioning it across the mouth of the cup while causing it to fold over the outer surface of the rib and be sandwiched between the cup flange 14 and the outer marginal portion 17 of the diaphragm.

An upper, electrically non-conductive, annular clamping die, generally similar to the lower clamping die, is then positioned against the outer marginal portion of the diaphragm, and the two dies are urged toward each other in clamping relationship with the peripheral flange sandwich assembly of the ampoule. While the assembly is so clamped, the metal ring 24 therein is rapidly and briefly heated by electrical induction to a temperature to heat the surrounding plastic slightly above its fusion temperature. This filling, assembling, and sealing procedure, except only for the inter-position of the membrane sheet material 19, is disclosed in detail and claimed in the aforementioned copending application Serial No. 252,272, of Russell P. Dunmire, and forms no part of the present invention.

After the dispensing device is filled, assembled, and heat sealed in the foregoing manner, the membrane 19 may be severed from the balance of the sheet material from which it is formed. Alternatively, this may be done at any prior stage after the assembly has been clamped for the sealing operation. In either case, the product is in a finished form, subject only to such sterilizing operations as may be required, capping the tip of the pipette (which may be done at any desired prior stage), and overwrapping the assembling if this is required.

Reference is next made to FIG. 8, which illustrates a modified embodiment of the ampoule shell adaptable for use in accordance with the present invention. There is also shown, in combination with this modified embodiment, a different pipette stem, which may be used equally advantageously with all of the shell forms of the invention. As in the case of the embodiment shown in FIGS. 1–4, the ampoule shell includes an inverted cup 40 which is defined by a relatively rigid upper end wall 41 and a circumferentially extending side wall that includes a relatively flexible upper portion 42 and a relatively more rigid lower portion 43. A diaphragm 44, which generally corresponds to the previously described diaphragm 13, extends across the mouth of the cup 40 and is sealed to a peripheral flange 45 of the cup. Extending axially and perpendicularly from the diaphragm 44 is a pipette stem 46 that is closed at its lower or terminal end 47. A metal ring 24 is employed between the diaphragm 44 and the flange 45 of the cup in the same manner as above.

In this particular arrangement, there is no thin membrane employed, and the medicament contained within the main body is in open communication with the inside of the pipette stem.

For purposes to be more fully explained, an annular rib 49, which is integrally formed on the upper surface of the diaphragm 43, extends into the mouth of the cup 40 for a greater distance than the previously described rib 18 of the diaphragm 13 shown in FIGS. 1–4. As is apparent from FIG. 8, when the rib 49 is pressed into the mouth of the cup 40, the rib engages the inner side wall surfaces of the body to effectively thicken and strengthen that portion of the side wall over the full height thereof. Thus, in the assembly, the diaphragm rib 49 may be considered as forming part of the lower side wall portion of the shell, and the radially inward, sloping surface 50 of the rib may be considered, in effect, as being a lower, inner, side wall surface of the shell.

In the modified shell of FIG. 8, the entire circumferentially extending side wall is externally conical with an outward and downward inclination. The thickness of the upper side wall portion substantially uniformly tapers from a minimum thickness adjacent the upper end wall 41.

In order to provide for the desired collapsing action of the shell, wherein an upper side wall portion is caused to progressively roll on itself and turn inside-out against the inner surface of a lower side wall portion, the top edge of the upper side wall is formed with an inturned shoulder containing an external, circumferential notch 51. This notch defines a thin zone of maximum flexibility at the upper end of the circumferentially extending side wall of the shell, which zone is no thicker and is preferably slightly thinner than the minimum thickness of the tapering upper side wall portion and thus constitutes a primary hinge at which collapsing of the side wall is controllably initiated.

A second circumferential notch or groove 52 is formed in the outside surface of the side wall of the ampoule shell between the upper and lower side wall portions. The side wall thickness of the shell at this second notch 52 is preferably slightly greater than the thickness at the upper notch 51, so as to form a secondary hinge that aids in locking the upper end wall 41 against the diaphragm 44 after the shell has been collapsed.

The second notch 52 divides the ampoule shell into a top section $T_1$ and a bottom section $B_1$. Inasmuch as the shell side wall is generally conical and has a tapering thickness increasing from its top toward its bottom, the upper side wall portion 42 is relatively flexible, and the lower side wall portion 43, which is further reinforced by the functionally integral rib 49 of the diaphragm, is relatively more rigid and inflexible and has a larger diameter. These relative wall thicknesses are such that the upper side wall portion 42 will progressively fold and roll on itself from its upper end when axially directed pressure is applied to the shell, while the lower side wall portion 43 will remain substantially undistorted. In this case, the rolling action is initiated at the upper notch 51, acting as a primary hinge, and progresses toward the lower notch 52, acting as a secondary hinge, as indicated in FIG. 8 by two dot-dash outlines showing successive stages of collapsing.

As in the case of the previously described embodiment of the invention, the relative heights $Y_1$ and $X_1$ of the upper and lower side wall portions 42 and 43, respectively, are carefully controlled to assure that substantially all of the medicament can be discharged by collapsing of the shell. More particularly, the ratio of the height $X_1$ of the lower side wall portion to the total height $Z_1$ of the entire side wall is such that the upper end wall 41 will seat against the diaphragm 44, and the upper side wall portion 42 will lie against the inner surface 50 of the diaphragm rib 49 when the ampoule is collapsed.

Referring to the closed tip of the pipette stem 46, it is intended that the tip be cut off with scissors or any suitable sharp instrument in order to permit discharge of the device. Accordingly, a slight, external circumferential shoulder 53, or any other clearly visible surface conformation or mark, is desirably formed thereon to indicate where the tip-severing cut should be made.

Reference is next made to FIGS. 9 and 10, which illustrate still another modified embodiment of the ampoule shell and of the pipette stem combined therewith. Again, the ampoule shell includes an inverted cup 60 which is defined by a relatively rigid upper end wall 61 and a circumferentially extending side wall that includes a relatively flexible upper portion 62 and a relatively more rigid lower portion 63. A diaphragm 64, which may be identical with the previously described diaphragm 13 and may include the same rib 18, extends across the mouth of the cup 60 and is sealed to a peripheral flange 65 of the cup. Extending axially and perpendicularly from the diaphragm 64 is the modified pipette stem 66 which, in this case, has an unobstructed, open, lower discharge end 67. The open discharge end of the pipette stem is closed, until ready for use, by a removable, combination cap and plug 68 that serves the same function as the cap 31 on the device of FIGS. 1–6. A metal ring 24 is employed between the diaphragm 64 and the flange 65 of the cup in the same manner and for the same purpose as in the previously described embodiments of the invention.

Again, as in FIG. 8, no thin membrane is shown, such as is included in the embodiment of FIGS. 1–6, although one may be employed if desired, together with the form of pipette stem 15 of the embodiment of FIGS. 1–6 or with the form of pipette stem shown in the embodiment of FIG. 8. Similarly, the pipette stem of the embodiment of FIGS. 9 and 10 may be employed with the diaphragm and cup construction of the embodiment of FIGS. 1–6 or of the embodiment of FIG. 8.

As in the case of the embodiment illustrated in FIG. 8, the upper side wall portion 62 of the cup 60 is conical with an outward and downward inclination, but in this case it may have a substantially uniform thickness between an external, circumferential notch or groove 69 at its upper end adjacent the upper end wall 61 to an internal, circumferential notch or groove 70 at its lower end where it joins the lower side wall portion 63.

In this embodiment, in contrast to those previously described, the lower side wall portion 63 is externally substantially cylindrical and internally conical with an inward and downward taper so that it varies from a minimum thickness at its upper end adjacent the internal circumferential notch 70 to a maximum thickness adjacent the peripheral cup flange 65. This tapering thickness and sloping inner surface of the lower side wall portion 63 corresponds in function to the combination of the lower side wall portion 43 and the vertically coextensive diaphragm rib 49 in the embodiment of FIG. 8.

The internal circumferential notch 70 divides the ampoule side wall into a top section $T_2$ that is defined by the relatively flexible upper side wall portion 62, and a bottom section $B_2$ that is defined by the relatively rigid and inflexible lower side wall portion 63. The side wall thickness at the external circumferential notch 69 may be slightly less than at the internal circumferential notch 70 so that the former acts as a primary hinge to initiate folding of the upper side wall portion 62 as the shell is collapsed by axially applied pressure, and the internal circumferential notch 70 acts as a secondary hinge which aids in locking the top section $T_2$ of the shell in an inverted, inside-out condition in which it is snugly nested within the bottom section $B_2$ of the shell.

In accordance with the previously described embodiments of FIGS. 1–8, the relative heights $Y_2$ and $X_2$ of the upper and lower side wall portions 62 and 63, respectively, are controlled to achieve maximum discharge of the shell contents. To this end, the location of the internal notch 70 is such that the ratio of the height $Y_2$ to the total height $Z_2$ of the side wall will permit the upper end wall 61 to be seated against the diaphragm 64 and the inverted upper side wall portion 62 to lie against the sloping inner surface of the lower side wall portion 63.

The collapsing action of the shell of FIG. 9, is generally similar to that discussed in connection with the structure of FIG. 8 except that the fold in the side wall is a more open one during most of the collapsing action, as schematically indicated in progressive stages in FIG. 9 by two dot-dash outlines. When pressure is applied to start axial downward movement of the upper end wall 61, the external notch 69, which constitutes the primary hinge in this embodiment, closes to aid in initiating the folding and collapsing of the side wall. Continued axial pressure on the ampoule causes the relatively flexible upper side wall portion 62 to progressively roll inside-out, as indicated by the upper dot-dash outlines in FIG. 9, and causes the loose folds 69' in the upper side wall portion to move toward the internal notch 70. In this particular embodiment of the invention, the upper side wall portion 62 may bow or flex outwardly a slight amount as it is rolled downwardly. However, the characteristic ease with which the upper side wall portion may be inverted is not significantly different than in the other embodiments of the invention.

During the initial folding movement, the shell is reversely bent as the primary hinge through a dead center position. As the collapsing continues, an elastic force distribution is gradually built up in the material of the upper side wall portion 62, which tends to further urge the upper end wall 61 downwardly toward the diaphragm 64.

In the final stage of collapsing movement, the upper end wall 61 is seated against the diaphragm 64 and wedged within the confines of the diaphragm rib 18, and the top body section $T_2$ is completely telescopically inverted and snugly nested within the bottom body section $B_2$ with the flexible upper side wall portion 62 disposed against the inner surface of the lower side wall portion 63. As this position is reached, the internal notch 70 is closed to locate the final downward bend or fold of the side wall. This internal notch minimizes the elastic stresses in the folded part of the side wall and, thus, the tendency of the side wall to unfold and of the ampoule shell to return toward its original shape.

As in the embodiment of FIGS. 1–6, it will be seen that both of the modified shells of FIGS. 7 and 8 provide for a progressive folding action by which an upper side wall portion of the shell is caused to roll from end to end thereof as the shell is collapsed and to turn inside-out against the inner surface of a lower side wall portion. This folding, rolling, and inverting action has again been aided by the provision of primary and secondary hinges which enable the shell to be controllably collapsed by a relatively small axial force. Again, the modified shell constructions also assure that very nearly all of the medicament can be discharged during the ejection.

Both of the modified embodiments of FIGS. 7 and 8 may obviously be filled, assembled, and heat sealed in essentially the same manner as the first embodiment of FIGS. 1–6. The only difference in this regard may result from the optional omission of the membrane 19 of the first embodiment.

The particular pipette stem to be employed in accordance with the present invention primarily depends upon the intended use of the device. It is preferred, however, that the pipette stem be 1½ to 1¾ inches or more in length so that it extends axially from the diaphragm past the fingers of the person utilizing the device (see FIG. 7). The bore at the terminal end of the pipette should be from about 0.080 to 0.090 inch. In many instances, the pipette stem may be of accentuated length, depending upon the requirements in use.

The preferred design of the pipette stem for a syringe containing a 1 cc. dosage unit would have the following dimensions: length, 1.5 inches; I.D. at the diaphragm, 0.125 inch; I.D. at the terminus, 0.085 inch. A wall thickness of 0.030 inch throughout the entire length of the pipette has been found to be suitable.

The dispensers designed in accordance with the present invention are also adaptable for use with mechanical applicators, which are particularly helpful for applying the greater collapsing forces that are required to discharge viscous or salve-like medicaments. Such mechanical applicators are the subjects of copending applications Serial No. 129,763, filed August 8, 1961, by Blumenthal and David, and Serial No. 139,000, filed August 8, 1961, in the name of Russell P. Dunmire (deceased).

From the foregoing description of several embodiments of the present invention, it will be apparent that various modifications can be made within the scope of the invention. Therefore, the invention is not intended to be limited to the particular details of construction and manufacture disclosed herein except as may be required by the appended claims.

What is claimed is:

1. In a device for delivering a dosage unit of a medicament, comprising a collapsible, hollow body having a pipette extending outwardly therefrom, the improvement wherein said body comprises a closed shell having a relatively rigid, circular, top end wall, a relatively rigid, circular, bottom end wall, and a circumferentially continuous side wall connecting said top and bottom end walls, and wherein said pipette extends substantially axially from said bottom end wall in direct open communication therethrough with the interior of the shell, said side wall having, as integrally formed parts, one end portion of relative rigidity and an opposite end portion of relative flexibility for flexing and folding under axially inward pressure applied to said end walls so as to turn one end portion of said side wall inside out within the other end portion thereof and bring said end walls into substantial contiguity for discharging liquid from the shell through said pipette.

2. The device of claim 1 wherein a terminal end of the said pipette has several small holes, distributed to discharge liquid as a spray of separate streams directed generally axially of the pipette.

3. The device of claim 2 wherein at least part of the hollow body is sealed from the pipette by a thin, rupturable membrane.

4. The device of claim 1 wherein the said pipette is sealed at its terminal end.

5. In a device for delivering a dosage unit of a medicament, comprising a collapsible, hollow body having a pipette extending outwardly therefrom, the improvement wherein said body comprises a closed shell having a relatively rigid, circular, top end wall, a relatively rigid, circular, bottom end wall, and a circumferentially continuous side wall connecting said top and bottom end walls, and wherein said pipette extends substantially axially from said bottom end wall in direct, open communication therethrough with the interior of the shell, said side wall having one end portion of relative rigidity and an opposite end portion of relative flexibility, and an annular portion of maximum flexibility at one end of the relatively flexible portion constituting a primary hinge foldable when inward axial pressure is applied to said end walls to initiate progressive rolling of the flexible wall portion upon itself from said primary hinge toward the opposite end of the said flexible wall portion whereby said flexible wall portion turns inside out within said relatively rigid wall portion with a controlled, predetermined, collapsing action when said top end wall is moved by said axial pressure into substantial contiguity with said bottom end wall for discharging liquid from the shell through said pipette.

6. The device of claim 5 wherein a terminal end of the said pipette has several small holes distributed to discharge liquid as a spray of separate streams directed generally axially of the pipette.

7. The device of claim 6 wherein at least part of the hollow body is sealed from the pipette by a thin, rupturable membrane.

8. The device of claim 5 wherein the said pipette is sealed at its terminal end.

9. In a device for delivering a dosage unit of a liquid medicament, comprising a collapsible, hollow body having a pipette extending outwardly from said body, the improvement wherein said body comprises a closed shell having a relatively rigid, circular, top end wall, a relatively rigid, circular bottom end wall, and a circumferentially continuous side wall connecting said top and bottom end walls, and wherein said pipette extends substantially axially from said bottom end wall in direct open communication therethrough with the interior of the shell, said side wall having a relatively rigid, lower portion, a less rigid upper portion, and a peripheral portion of maximum flexibility at one end of said upper portion constituting a primary hinge foldable when inward axial pressure is applied to said end walls to initiate progressive rolling of said upper side wall portion upon itself from said primary hinge toward the oposite end of said upper side wall portion, whereby said upper side wall portion turns inside out within said lower side wall portion with a controlled, predetermined, collapsing action when said top end wall is moved by said axial pressure into substantial contiguity with said bottom end wall for discharging liquid from the shell through said pipette.

10. The device of claim 9 wherein a terminal end of the said pipette has several small holes distributed to discharge liquid as a spray of separate streams directed generally axially of the pipette.

11. The device of claim 10 wherein at least part of the hollow body is sealed from the pipete by a thin rupturable membrane.

12. The device of claim 9 wherein the said pipette is sealed at its terminal end.

13. In a dispensing device for fluent materials,
a hollow body having an axis, and being formed of a plastic material,
said body having relatively rigid end walls and an endless side wall extending therebetween,
one of said end walls being connected to said side wall by primary hinge means to permit said side wall to flex relative to said one end wall,
said other end wall being connected to said side wall by a relatively rigid connection,
one of said end walls including an opening,
said side wall comprising first and second sections separated from one another by secondary hinge means,
said secondary hinge means having relatively greater flexibility than said primary hinge means,
said first side wall section extending between said primary and secondary hinge means,
and said second side wall section extending between said secondary hinge means and said other end wall,
whereby application of axial force against said end walls to move said end walls toward one another is effective to axially roll said first side wall section progressive from said secondary hinge means into said secondary side wall section.

14. In a dispenser for fluent materials,
a hollow body comprising relatively rigid, spaced end walls, and an endless side wall extending therebetween,
one of said end walls being connected to said side wall by peripherally extending primary hinge means to permit flexure of said side wall relative to said one end wall,
said side wall comprising adjacent sections joined to one another by peripherally extending secondary hinge means,
said secondary hinge means having relatively greater flexibility than said primary hinge means,
said side wall between said primary and secondary hinge means comprising a first section, and between said secondary hinge means and said other end wall, a second section,
said first wall section being made of a flexible material, and said second wall section being more rigid than said first section and joined to said other end wall by relatively rigid joinder means,
whereby application of axial force against said end walls to move said walls toward one another is effective to axially collapse and roll said first wall section preferentially from said secondary hinge means into said second wall section.

15. The invention of claim 14, wherein one of said end walls includes dispensing opening means.

16. In a dispenser for fluent materials,
a hollow body formed of plastic,
said body comprising relatively rigid, spaced end walls and an endless side wall extending therebetween,
said side wall comprising first and second adjacent sections,
said first section being of relatively greater flexibility than said second section and being joined to one of said end walls by peripherally extending primary hinge means to permit flexure of said side wall relative to said one end wall,
said first wall section being joined to said second wall section by peripherally extending secondary hinge means of relatively greater flexibility than said primary hinge means, said second wall section being joined at its other end to said other end wall by relatively rigid joinder means, and one of said end walls including a dispensing opening having a pipette operatively connected thereto and extending away from said hollow body, whereby application of axial force against said relatively rigid, spaced end walls to move said walls toward one another is effective to axially roll said first wall section preferentially from said second hinge means into said second wall section in a manner to permit said end walls to force out through said pipette, fluent materials placed within said hollow body.

17. In a dispenser for fluent materials, a hollow body formed of plastic, said body comprising relatively rigid and spaced end walls and an endless side wall extending therebetween, said side wall comprising first and second adjacent sections, said first section being of relatively greater flexibility than said second section and being joined to one of said end walls by peripherally extending primary hinge means to permit flexure of said side wall relative to said one end wall, said first side wall section being joined to said second side wall section by peripherally extending secondary hinge means of relatively greater flexibility than said primary hinge means, said secondary wall section being joined at its other end to said other end wall by a relatively rigid joinder, one of said walls including dispensing opening means, and a rupturable membrane extended across one of said wall sections and forming a sealed reservoir for fluent materials, defined by said membrane, one of said end walls, and a portion of said side wall, whereby application of axial force against said end walls to move said end walls toward one another, is effective to burst said membrane, and axially roll said first wall section preferentially from said second hinge means into said second wall section in a manner to permit said end walls to force out through said dispensing opening means, fluent materials placed within said sealed reservoir.

References Cited by the Examiner
UNITED STATES PATENTS

| | | | |
|---|---|---|---|
| 598,676 | 2/98 | Lockmann | 222—386.5 |
| 2,311,367 | 2/43 | Chambers | 222—209 X |
| 2,401,617 | 6/46 | Cochran | 222—541 X |
| 2,608,320 | 8/52 | Harrison | 222—386.5 X |
| 3,071,294 | 1/63 | Galbierg | 222—541 X |

LOUIS J. DEMBO, *Primary Examiner.*

RAPHAEL M. LUPO, *Examiner.*